United States Patent
Lee et al.

(10) Patent No.: US 6,947,269 B2
(45) Date of Patent: Sep. 20, 2005

(54) RELAY-TO-RELAY DIRECT COMMUNICATION SYSTEM IN AN ELECTRIC POWER SYSTEM

(75) Inventors: Tony J. Lee, Pullman, WA (US); David G. Bogut, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 976 days.

(21) Appl. No.: 09/900,098

(22) Filed: Jul. 6, 2001

(65) Prior Publication Data

US 2003/0007514 A1 Jan. 9, 2003

(51) Int. Cl.[7] ................................................ H02H 3/00
(52) U.S. Cl. ........................................ 361/64; 361/81
(58) Field of Search ............................... 361/62, 64, 66, 361/80, 81

(56) References Cited

U.S. PATENT DOCUMENTS 4,899,383 A * 2/1990 Einolf et al. ................ 370/510
5,889,474 A * 3/1999 LaDue ..................... 340/825.49
6,160,806 A * 12/2000 Cantwell et al. ............ 370/360

* cited by examiner

Primary Examiner—Stephen W. Jackson
(74) Attorney, Agent, or Firm—Cook, Alex, McFarron, Manzo, Cummings & Mehler, Ltd.

(57) ABSTRACT

The system provides communication of information between at least two protective relays serving a power system line. The communication comprises a series of successive data messages of four characters, each of which includes eight data bits, on eight data channels. The data bits include output function status bits from the transmitting relay on user selected channels, serialized analog data bits on other user selected channels, and virtual terminal data bits on still other user selected channels. A synchronization channel produces information to synchronize the transmission/receiving of the analog data and the virtual terminal data, on the basis of frames of data, each frame containing 18 messages.

13 Claims, 2 Drawing Sheets

RELAY-TO-RELAY DIRECT COMMUNICATION SYSTEM IN AN ELECTRIC POWER SYSTEM

TECHNICAL FIELD

This invention relates generally to communication systems for communication of information between protective relays in an electric power system, and more specifically concerns such a system which includes the direct communication of output status indications from one relay to a second relay protecting the same power line.

BACKGROUND OF THE INVENTION

In U.S. Pat. No. 5,793,750, the contents of which are hereby incorporated by reference, a communication system between two microprocessor-based protective relays for an electric power system is disclosed. Each of the two relays in that system has both transmit and receive modules, for directly transmitting output status bits indicative of the result of selected protective functions of one relay from that one relay to the other, and vice versa.

The output status indications, also referred to as output function information, in the form of bits, are used to identify the existence and location of a fault on the power line portion served by the two relays. One or both of the relays might initiate a circuit breaker trip action on the basis of the exchange of such information. The output status indications (bits) are the result of processing functions in one of the relays involving the voltages and/or currents on the power line. The output status indications are used for various relay and relay operations, including permissive overreaching transfer trip (POTT) actions, permissive under-reaching transfer trip (PUTT) actions, directional comparison unblocking (DCUB) and direct transfer trip (DTT) actions. Other relay-to-relay operations are possible using particular output status indications.

The advantage of the communication system described in the '750 application is that it is fast and secure. Protective relays typically accomplish their monitoring functions each 1/16 of a power system cycle or approximately every millisecond. The '750 communication system provides the results of these functions in one relay to the other relay. The information is transmitted directly over a communications link from an originating relay which may or may not trip its associated circuit breaker, based on its operational results, to the other relay, which uses the transmitted information, in the form of digital bits, to perform its own on-going calculations, producing a trip signal when appropriate. The communication between the two relays is bi-directional, allowing the two relays to exchange information concerning the results of their own calculations both quickly and securely, with a minimum amount of expense.

In the '750 application, the output function capability is eight bits. In many cases, however, eight channels are not necessary. Two or three bits are usually sufficient to accomplish the desired relay-to-relay protective scheme. A substantial number of bits therefore may go unused. The present invention makes use of those otherwise unused bits. It forms a serial data stream or channel from each unused bit, and utilizes those serial data channels to significantly increase the communication of information between the two relays. This invention may utilize none, some or all of the eight channels to transfer output status indications. If less than all eight channels are used for output status indications, the otherwise unused channels may be used to transfer other selected information.

SUMMARY OF THE INVENTION

Accordingly, the present invention is a system of communicating information over a communication line which connects at least two protective relays for an electric power line, wherein communication between the two relays is in the form of successive data messages which include the output status bits from one relay to the other relay, the output bits representing the result of protection function carried out by the one relay, wherein the communication has a channel capacity which is not completely used by the output bits transmitted, the communication system of this invention comprising: processing means for encoding additional data from said one relay and inserting it into vacant channels in the communication between the two relays; means for including synchronization information for said additional data on a synchronization channel in the communication, as part of the successive data messages; means for transmitting said data messages successively on the communication line; and processing means at the second relay for receiving and decoding the successive data messages to produce replicated output bits and the additional data transmitted from the one relay, wherein the speed and security of the additional data is approximately at least as good as that for the output bits.

BEST MODE FOR CARRYING OUT THE INVENTION

As indicated above, the present invention is based on and is an improvement of the communication system of U.S. Pat. No. 5,793,750, which includes a direct communication link between two associated protective relays serving an electric power line, the system supporting a communication arrangement or protocol involving eight data channels for exchange of output status (function) information between the two relays both quickly and securely. The indicators TMB1–TMB8 identify eight transmit bits, on eight channels.

Those bits, when received by the other relay, are identified as receive bits RMB1–RMB8, wherein RMB1–RMB8 are the "mirror" or replicated transmit bits. The eight channels provide the ability to accommodate at least eight output status indications. As indicated above, however, in many two-relay arrangements, only two or perhaps three channels are necessary for the desired communication. In the present invention, the otherwise vacant channel space in the previous system is taken up by selected additional data and a synchronization channel for the additional data.

The additional data can be selected analog quantities, such as metering data, or can be "virtual terminal" communication information. In a virtual terminal arrangement, a human user connects to a port of a local relay and then uses the communication link to communicate with the other relay. Hence, the relay acts in effect as a "terminal", in the sense that the relay is not a part of the actual communication system but can supply information to the second relay over the communication link.

Figure 1:
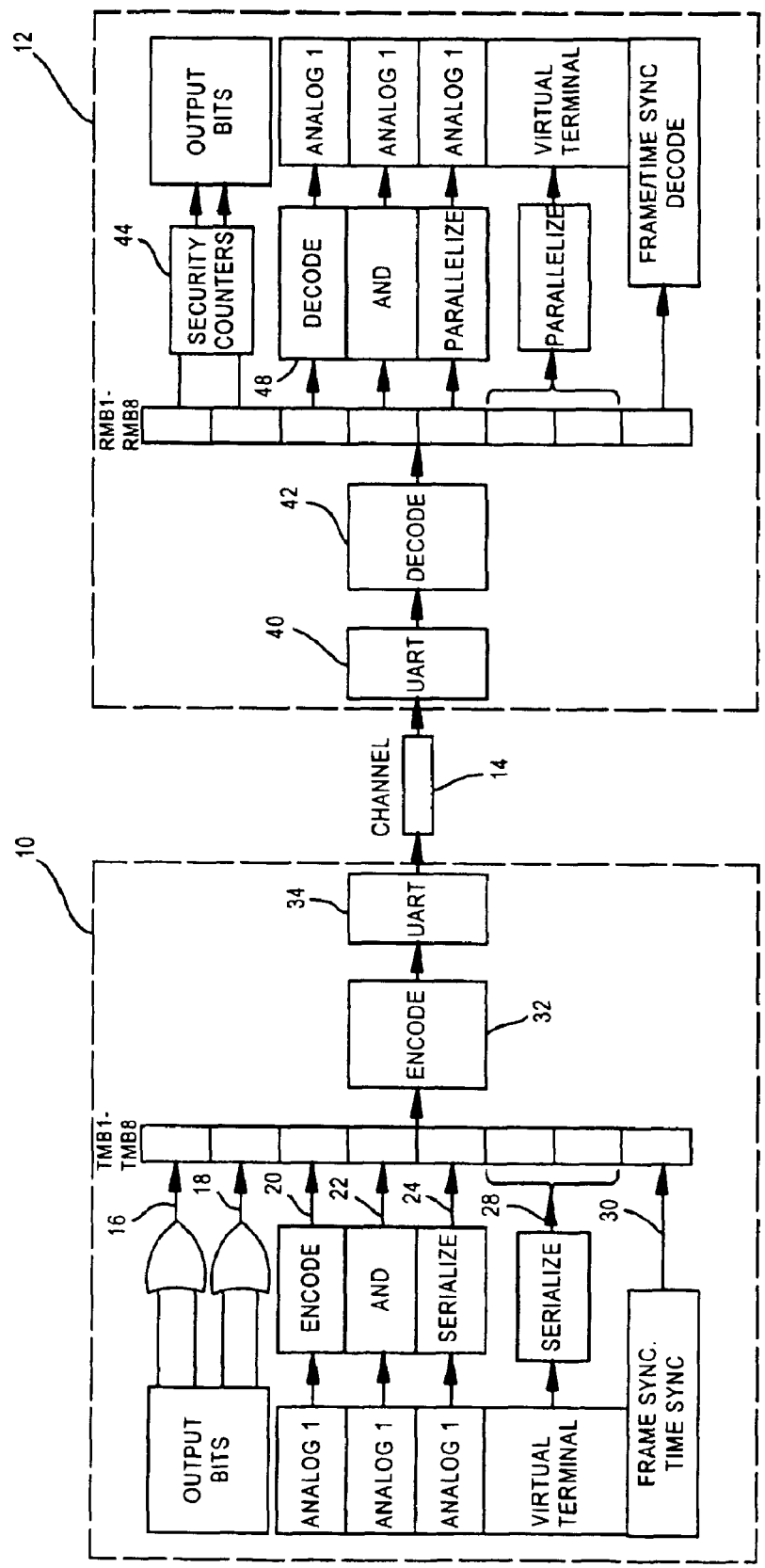
FIG. 1 is a schematic diagram showing the overall communication system of the present invention.

FIG. 1 shows the basic communication system of the present invention. FIG. 1 is based on an eight data channel arrangement. It should be understood, however, that a different number of data channels could be used. Eight channels is for illustration only. At one relay (the transmitting relay) is shown a "transmit" module 10, and at a second, associated relay (the receiving or remote relay) is shown a "receive" module 12. Each relay, however, will typically have both transmit and receive modules to enable bi-directional communication.

Transmit module 10 and receive module 12 are connected via a physical communication line or channel 14. Communication line 14 could be microwave, audio, fiber optic or other type of communication link. Typically, the channel will be a fiber optic link. In FIG. 1, the capability of the system of the present invention to include additional data along with output function status bits is shown. Additional analog data could include metering information, breaker failure system security enhancement information, reclose enable information, instrument transformer checking and multi-terminal fault location information. Other analog data could also be transmitted.

In FIG. 1, two channels 16 and 18 are used for the conventional output status indications (bits) from the transmitting relay. These are bits TMB1 and TMB2 in the transmitted message. In the particular example shown in FIG. 1, three channels 20, 22 and 24 are used for additional data in the form of analog messages. The analog message in each channel is serialized so that each block of eight transmitted message bits (TMB1–TMB8) includes one bit for each analog message data, i.e. one eight bit block includes, for each analog message channel, one bit of that channel's assigned message. Successive eight bit blocks provide successive bits of the analog messages for the three analog message channels.

It should be understood, however, that the three analog message channel arrangement of FIG. 1 is arbitrary; analog data could be on more or fewer channels. When the arrangement of the communication system is established, the user has the opportunity to select the particular characteristics of the system, i.e. the number of output function information channels to be used, the number of analog information channels and the number of virtual terminal information channels. In the embodiment of FIG. 1, the analog channels have bits TMB3, 4 and 5 in each eight bit block. Two additional channels contain virtual terminal information (shown as a single channel 28). Again, virtual terminal information refers to information provided by a user at a local relay over the communication link to a remote relay. The local relay thus becomes a virtual terminal, a conduit between the user and the remote relay. The virtual terminal information is also serialized bit-by-bit. The bits on the two virtual terminal channels comprise transmit bits TMB6 and 7 in the eight bit block transmitted to the remote relay. In the embodiment shown, each analog value 1, 2, 3 and each virtual terminal value is 18 bits long. This could be changed, however.

The remaining channel 30 is for synchronization information, which synchronizes the virtual terminal and analog channel information on channels 20, 22, 24, and 28. The bit on channel 30 is bit TMB8 in the eight bit block.

The eight bits TMB1–TMB8 are then encoded by encoder 32 into a transmit message for transmission to the remote relay. The encoder can produce a variety of code formats. One format is as follows. A single transmit message consists of 36 or 40 bits, which are divided into four 9 or 10 bit characters plus a number of idle bits, the number of which vary depending upon the selected transmission speed.

The bits are transmitted in the following order in the message. The first 9–10 bit character comprises a single start bit followed by six data channel bits (TMB1–TMB6), followed by an odd parity bit and one or two stop bits, as selected by the user. The second character comprises a second single start bit, another six bits of data channel bits (TMB5, 6, 7, 8, 1 and 2) followed by an odd parity bit and one or two stop bits. The third character includes a start bit followed by six channel bits (TMB7, 8, 1, 2, 3 and 4) followed by an odd parity bit and one or two stop bits. The fourth and last character in the message includes a single start bit followed by six data channel bits (TMB3–TMB8) followed by an odd parity bit and one or two stop bits. The remaining bits, if any, in the message are a variable number of idle bits, depending upon transmission speed of the data.

The actual channel data is thus repeated three times in the one message, with single stop and parity bits and one or two stop bits between each character portion of the message.

This arrangement format allows the receiver to check for errors that may occur during transmission, which provides the security for the transmitted message. The transmit encoder 32 logically inverts one of the four characters in the messages as a means of encoding an identifier pattern into the message. The identifier pattern is selected by the user during system configuration. The user configures the receiver to expect the same identifier pattern. As described below, the receiving relay ensures that the received message has been encoded with the correct identifier pattern. It should be understood that many alternative message formats are possible within the spirit of the invention.

The encoded message is then applied to a UART (universal asynchronous receive/transmit) interface element 34, which is conventional but is designed to satisfy several operating parameters for the system. The UART prepares the encoded message for transmission over the channel/link 14. The UART in the embodiment shown must be capable of interfacing a serial encoded character consisting of one start bit, six data bits, one parity bit and one or two stop bits. It must also be capable of checking a receive message for proper framing (indicated by the presence of one stop bit) as well as parity bits and detecting overrun errors.

The UART 34 is also programmable for various baud rates. For example, it might be programmed for baud rates ranging from 300 through 115,000. The UART further can synchronize both transmit and receive data using transmit and receive clocks externally supplied. The method of bit synchronization, via start and stop bits or via synchronizing clocks, may certainly differ from that described.

The encoded message is then transmitted over communication link 14. In one example, where the transmitting relay samples and performs its monitoring functions every $\frac{1}{16}$th of a power system cycle, messages are sent at 1 millisecond intervals, reflecting the sampling rate of the relay. This, of course, can vary depending upon the operation of the transmitting relay. The present arrangement provides real time communication of protection and control information (the output function bits) along with additional data on the otherwise vacant channels.

The transmitted messages are received by the receive module 12 at the second relay. In the second relay, UART 40 provides the counterpart functions of the transmit UART 34. The UART 40 performs several data checks on each received character. It checks each character for proper framing, parity and overrun errors. From UART 40, the characters are passed to decoder 42. The decoder collects groups of four characters to reconstruct a message. The decoder then checks each message for errors, and also examines the results of the UART checks described above.

Figure 2:
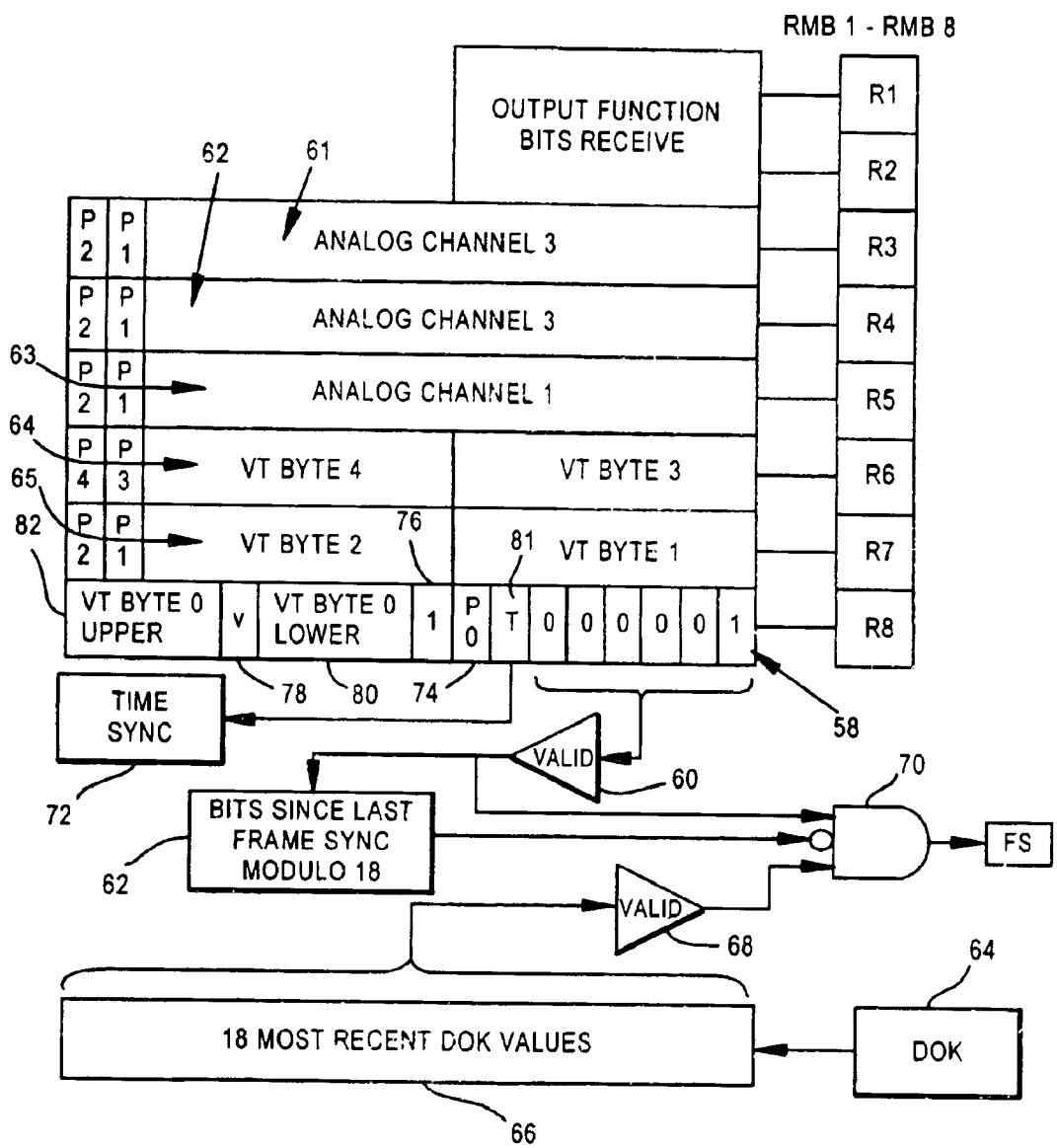
FIG. 2 is a schematic diagram showing in more detail a receive portion of the communication system of FIG. 1.

If any of the checks fail, the decoder discards the message and deasserts the DOK (data OK) flag 64 for that message in register 66 in FIG. 2.

More specifically, decoder 42 checks for consistency of the three copies of the eight data bits in the four character transmitted message. It also checks to ensure that the transmitted message was encoded with the proper identifier pattern described above. This is, however, only one way to detect errors in the message. Other methods are possible.

The result from decoder 42 is received data bits RMB1–RMB8 which are the mirror or replica of transmitted bits TMB1–TMB8 and a DOK flag 64 for the message, which is an indication that there were no errors detected in the received message.

The first two bits (RMB1, 2) are the output function status bits in this example, and are applied to security counters 44. The security counters ensure the status of the received function bits remains constant for a settable number of receive messages before the bits are utilized by downstream processes. This further increases the security of the output function status bits.

The two output function bits RMB1, 2 are transmitted bit by bit, so no synchronization of those bits is required. The output function bits are used by the relay to make determinations concerning operation of the power system, including possible circuit breaker trip action when appropriate. In the embodiment shown, the next three data channel bits RMB3–RMB5 contain digitized analog values. These values are received serially one bit per channel per message, and are then parallelized in element 48. Element 48 gradually and separately builds the three original analog values (analog values 1, 2 and 3) from the successive messages. Each analog value comprises 18 bits. In the embodiment show, 16 bits are actual information, and two bits are unused in the present invention. Therefore, for every 18 messages, a complete original analog value is received on each analog channel.

The same is true for the two bits in the embodiment shown (RMB6 and RMB7) for the virtual terminal data. The virtual terminal data is received serially one bit per channel per message, and are also parallelized in element 48. Each virtual terminal value also comprises 18 bits in the embodiment shown. Sixteen bits are for actual virtual terminal information, divided into two eight-bit characters; the two additional bits indicate which of the two eight-bit character fields actually contain virtual terminal data, and which, if any, are idle, e.g. waiting for user input. Therefore, every 18 messages, two virtual terminal characters are received on each virtual terminal channel. The virtual terminal and analog data, after being parallelized by element 48, are provided to the receiving relay.

Again, the particular arrangement of the eight data bits TMB1–TMB8 is established by the user, in accordance with the user's communication requirements. Different numbers of output function bits, analog data bits and virtual terminal bits can form the seven bits of the eight-bit data stream.

The remaining bit (RMB8) forms the synchronization channel. It helps the receiving decoder and parallelizer 48 find the boundaries between the serially transmitted analog and virtual terminal 18 bit data blocks. The synchronization channel is necessary when at least one of the other data channels being transmitted includes analog and/or virtual terminal data. If all of the channels include only output function status bits, no synchronization is necessary and the eighth channel may also be used for output function status.

FIG. 2 shows a transmitted "frame" of information, comprising 18 messages, including 18 bit synchronization channel, in detail. The analog and virtual terminal channels 51–55 (RMB3–RMB7) each define an 18 bit data frame. On the synchronization channel 58, a comparator 60 first detects a particular bit pattern of 000001 in the six most recently received bits (from the six most recently received messages). When that pattern is detected, comparator 60 checks a modulo 18 counter 62. If the counter is not at zero, comparator 60 resets it to zero and discards all of the data received since the last valid frame sync (FS) signal. If the counter 62 is at zero, and if all of the 18 most recent DOK flags contained in register 66 are valid (binary one), then AND gate 70 asserts an FS signal, and the analog and virtual terminal data are used by the relay.

The synchronization channel 58 (RMB8) also contains an additional virtual terminal character broken into four-bit pieces 80 and 82. Bit 74 in FIG. 2 is a binary one if the additional virtual terminal character contains valid data, and is binary zero if the additional virtual terminal character is idle (such as might be the case if the virtual terminal session is waiting for input from the user). Bit 76 of the 18 bit synchronization frame on channel 58 is always binary 1. Bit 78 is typically also binary 1 except for special conditions described below. When bits 78 and 76 are binary 1, it is not possible to have five consecutive zeros in the synchronization channel. This ensures that the frame synchronization pattern 000001 detected by comparator 60 can only occur at frame boundaries.

The additional virtual terminal information contained in half-bytes 80 and 82 in FIG. 2 can also contain control characters, intended to indicate from one relay (transmitting) to the other (receiving) when the virtual terminal communication should be established, terminated, paused, etc. When one of these special characters occupies the additional virtual terminal character, bit 78 in FIG. 2 is forced to zero. The special control characters are chosen carefully by the system designer such that, even with bit 78 at binary zero, the frame synchronization pattern 000001 can only occur at a frame boundary.

Bit T (81) in the synchronization channel comprises a separate serial data stream, transmitted at the rate of one bit per 18 messages (frame). This serial data stream contains date and time information. Each time the FS signal created by AND gate 70 asserts, the time synchronization device 72 accepts data bit T. An additional frame synchronization system, similar to the frame synchronization system described above, allows the time synchronization device 72 to recognize the boundaries between successive time synchronization messages. Namely, a specific frame synchronization pattern is placed in the serial data stream formed by bit T. A comparator detects that pattern, and signals that the time of day and calendar day information contained in the serial data stream formed by bit T may be used. The data contained in the serial stream formed by bit T may be used. The data contained in the serial stream formed by bit T is formatted such that the frame synchronization pattern can only occur at frame boundaries. The time synchronization device 72 updates the time-of-day clock and the calendar day with the information received in the serial stream formed by successive T bits.

Accordingly, a communication system has been disclosed which is used between two protective relays on an electric power line. The communication system is arranged to communicate output function status bits which represent the result of protection functions by one of the relays, selected analog information concerning one or more functions of the relay, as well as virtual terminal data provided by a user to one of the relays and time synchronization, the analog data and the virtual terminal data being processed in serial fashion in successive messages on channels not used by the output function bits. Time synchronization data is processed in serial fashion in successive frames (18 messages) of data.

The selection and arrangement of the channels for the output function bits and the additional data (analog data and the virtual terminal data) is accomplished by the user. The additional data could be all analog data, virtual terminal data or a combination of both. A synchronization channel is used to synchronize the additional data, to transmit/receive additional virtual terminal information and time and calendar (date) information. This results in the channel capability of the basic transmission arrangement disclosed in the '750 patent being used to its maximum extent, while providing the benefits of the existing fast and highly secure transmission of output function bits.

Although a preferred embodiment of the invention has been disclosed here for purposes of illustration, it should be understood that various changes, modifications and substitutions may be incorporated in the embodiment without departing from the spirit of the invention, which is defined by the claims which follow.

What is claimed is:

1. A system of communicating information over a communication line which connects at least two protective relays for an electric power line wherein communication between the two relays is in the form of successive data messages which include output status bits from one relay to the other relay, the output bits representing the result of protection functions carried out by the one relay, wherein the communication has a channel capacity which is not completely used by the output bits transmitted, the communication system of this invention comprising:

processing means for encoding additional data from said one relay and inserting it into vacant channels in the communication between the two relays;

means for including synchronization information for said additional data on a synchronization channel in the communication, as part of the successive data messages;

means for transmitting said data messages successively on the communication line; and processing means at the second relay for receiving and decoding the successive data messages to produce replicated output bits and the additional data transmitted from the one relay, wherein the speed and security of the additional data is approximately at least as good as that for the output bits.

2. A system of claim 1, wherein the additional data is provided in a serial manner in said channels in successive data messages.

3. A system of claim 1, wherein the additional data includes analog data concerning one or more functions of the one relay.

4. A system of claim 1, wherein the additional data includes virtual terminal data originated by a user for transmission to the other relay.

5. A system of claim 1, wherein the communication includes at least an eight channel capability.

6. A system of claim 1, wherein the additional data comprises successive analog quantities.

7. A system of claim 6, wherein each analog quantity is represented by a selected number of bits.

8. A system of claim 7, wherein the selected number is 18.

9. A system of claim 1, wherein the communication is in the form of successive frames of information, each frame comprising a selected number of data messages, each data message comprising a selected number of bits.

10. A system of claim 9, wherein the selected number of data messages is 18 and wherein the selected number of bits is eight.

11. A system of claim 9, including a bit recognition system for frame synchronization of the communication between the two relays, wherein the synchronization information includes a frame synchronization bit pattern recognizable by the bit recognition system, wherein all information received since a last successful frame synchronization is discarded if the messages comprising the frame have not all been accepted as valid.

12. A system of claim 1, wherein the information on the synchronization channel includes additional virtual terminal data, and an indication of whether virtual terminal information is included on the synchronization channel.

13. A system of claim 1, wherein the synchronization channel includes time synchronization information for aligning clocks in the two relays.

* * * * *